United States Patent
Desbois-Renaudin et al.

(10) Patent No.: US 12,040,465 B2
(45) Date of Patent: Jul. 16, 2024

(54) ELECTRIC STORAGE CELL MODULE, AND BATTERY COMPRISING A PLURALITY OF MODULES

(71) Applicant: Commissariat à l'Energie Atomique et aux Energies Alternatives, Paris (FR)

(72) Inventors: Matthieu Desbois-Renaudin, Villard-des-Lans (FR); Jean-Noël Carminati, Gresy-sur-Aix (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/733,427

(22) PCT Filed: Jan. 25, 2019

(86) PCT No.: PCT/FR2019/050169
§ 371 (c)(1),
(2) Date: Jul. 26, 2020

(87) PCT Pub. No.: WO2019/145653
PCT Pub. Date: Aug. 1, 2019

(65) Prior Publication Data
US 2021/0098845 A1  Apr. 1, 2021

(30) Foreign Application Priority Data
Jan. 29, 2018 (FR) .................................. 1850673

(51) Int. Cl.
*H01M 50/213* (2021.01)
*H01M 10/613* (2014.01)
(Continued)

(52) U.S. Cl.
CPC ....... *H01M 10/613* (2015.04); *H01M 10/643* (2015.04); *H01M 10/6568* (2015.04);
(Continued)

(58) Field of Classification Search
CPC ............. H01M 10/613; H01M 10/643; H01M 10/6567; H01M 10/6568; H01M 50/20;
(Continued)

(56) References Cited

U.S. PATENT DOCUMENTS 6,106,972 A   8/2000  Kokubo et al.
7,531,269 B2  5/2009  Wegner
(Continued)

FOREIGN PATENT DOCUMENTS

EP   2200110 A1   6/2010
EP   2426779 A2   3/2012
(Continued)

OTHER PUBLICATIONS

Translation of the Written Opinion for teh International Searching Authority for International Application No. PCT/FR2019/050169 dated Apr. 18, 2019, 7 pages.
(Continued)

Primary Examiner — Lingwen R Zeng
(74) Attorney, Agent, or Firm — Jordan IP Law, LLC (57) ABSTRACT

A module (10) for a battery includes accumulators (20), a first flange (22A) including first through openings, the accumulators being secured in the first openings, first electrically-conductive plates (24A), each first plate being connected to the accumulators of a first accumulator assembly, a second flange (22B) including second through openings, the accumulators being secured in the second openings, second electrically-conductive plates (24B), each second plate being connected to the accumulators of a second accumulator assembly, and first, second, and third chambers
(Continued)

partly delimited by the first and second flanges and containing a dielectric liquid, the first flange including first passages for the dielectric liquid between the first and second chambers and the second flange including second passages for the dielectric liquid between the second and third chambers.

10 Claims, 10 Drawing Sheets

(51) Int. Cl.
 *H01M 10/643* (2014.01)
 *H01M 10/6568* (2014.01)
 *H01M 50/502* (2021.01)
 *H01M 10/6567* (2014.01)
(52) U.S. Cl.
 CPC ....... *H01M 50/213* (2021.01); *H01M 50/502* (2021.01); *H01M 10/6567* (2015.04); *Y02E 60/10* (2013.01); *Y02P 70/50* (2015.11)
(58) Field of Classification Search
 CPC ... H01M 50/213; H01M 50/502; Y02E 60/10; Y02P 70/50
 See application file for complete search history.

(56) References Cited

U.S. PATENT DOCUMENTS

| | | | |
|---|---|---|---|
| 9,431,685 B2 | 8/2016 | Dibos et al. | |
| 2006/0078789 A1* | 4/2006 | Wegner | H01M 10/625 |
| | | | 429/120 |
| 2008/0318121 A1* | 12/2008 | Takagi | H01M 10/643 |
| | | | 429/120 |
| 2009/0317698 A1* | 12/2009 | Murata | H01M 8/04074 |
| | | | 361/689 |
| 2011/0008657 A1 | 1/2011 | Chung et al. | |
| 2012/0094163 A1* | 4/2012 | Fuller | H01M 10/0525 |
| | | | 429/99 |
| 2013/0122331 A1 | 5/2013 | McDonald | |
| 2013/0328392 A1 | 12/2013 | Desbois-Renaudin et al. | |
| 2014/0162106 A1 | 6/2014 | Fuerstner | |
| 2017/0005384 A1 | 1/2017 | Harris et al. | |
| 2018/0040933 A1* | 2/2018 | Inoue | H01M 50/20 |

FOREIGN PATENT DOCUMENTS

| | | |
|---|---|---|
| JP | 2005285455 A | 10/2005 |
| JP | 2007165200 A | 6/2007 |
| WO | 2012013641 A1 | 2/2012 |

OTHER PUBLICATIONS

Translation of the Written Opinion for the International Searching Authority for International Application No. PCT/FR2019/050168 dated Apr. 18, 2019, 6 pages.
International Search Report for International Application No. PCT/FR2019/050168 dated Apr. 18, 2019, 3 pages.
International Search Report for International Application No. PCT/FR2019/050169 dated Apr. 18, 2019, 3 pages.

* cited by examiner

ELECTRIC STORAGE CELL MODULE, AND BATTERY COMPRISING A PLURALITY OF MODULES

FIELD

The present invention generally concerns batteries of power storage elements, also called accumulators, connected in series and/or in parallel.

BACKGROUND

A battery comprises one or a plurality of interconnected battery modules. Each battery module comprises an assembly of electric accumulators connected to one another by electric connection elements.

The battery may comprise a system of thermal conditioning of the electric accumulators, which enables to cool or to heat the electric accumulators to improve the performance and the lifetime of the battery. There exist systems of thermal conditioning with air, with water or glycol water, or with a dielectric liquid.

A disadvantage of a system of thermal conditioning with air is the low cooling performance. A disadvantage of a system of thermal conditioning with water is that water and glycol water have a low dielectric strength. The cooling liquid should then be physically separated from all the electric conductors of the battery. The battery structure may then be complex and the cooling performance may be insufficient. Further, in case of a shock, a water leak within the battery may generate a current leakage, or even a short-circuit.

A system of thermal conditioning with a dielectric liquid has the advantage that the cooling liquid may be in direct contact with the electric conductors and the accumulators. US patent application 2017/0005384 describes a battery comprising a thermal conditioning system capable of using a dielectric liquid. A disadvantage of the battery described in US patent application 20170005384 is that it has a complex structure. Further, the battery manufacturing method may comprise steps of gluing of the electric accumulators, which may make disassembly and/or maintenance operations difficult.

A battery module may comprise a plurality of stages of electric accumulators, the stages being series-assembled, each stage comprising a plurality of electric accumulators assembled in parallel. The number of stages and the number of accumulators per stage depend on the application targeted for the battery. It would be desirable for the modification of the number of stages and of the number of electric accumulators per stage to be performed in simple fashion by modifying the fewest possible battery parts. It would further be desirable for the modification of the number of stages and of the number of electric accumulators per stage to be performed by modifying a small number of steps of the battery manufacturing method.

SUMMARY

Thus, an object of an embodiment is to at least partly overcome the disadvantages of the previously-described batteries.

An embodiment aims at a battery comprising a system of thermal conditioning of the electric accumulators using a dielectric liquid.

An embodiment aims at a battery having a simple structure.

An embodiment aims at a method of assembly of a battery which comprises no gluing step.

An embodiment aims at a battery adapted to lithium-ion accumulators.

An embodiment aims at a battery for which disassembly and/or maintenance operations are simple.

An embodiment aims at a battery module comprising a plurality of stages of electric accumulators for which the number of stages and the number of electric accumulators per stage may be modified in simple fashion, particularly by modifying a small number of battery parts.

An embodiment aims at a battery module comprising a plurality of stages of electric accumulators for which the number of stages and the number of electric accumulators per stage may be modified by changing a small number of steps of the battery manufacturing method.

An embodiment provides a module for a battery comprising:

a accumulators, each first accumulator having first and second ends and an intermediate portion coupling the first and second ends;

a first flange comprising first through openings, the first ends of the accumulators being secured in the first openings;

a first electrically-conductive plates, each first plate being connected to the first end of the accumulators of a first assembly of accumulators among first assemblies of accumulators;

a second flange comprising second through openings, the second ends of the accumulators being secured in the second openings;

second electrically-conductive plates, each second plate being connected to the second ends of the accumulators of a second assembly of accumulators among second assemblies of accumulators, all the first and second plates having the same structure; and first, second, and third chambers partly delimited by the first and second flanges and intended to contain a dielectric liquid, the first flange separating the first and second chambers and the second flange separating the second and third chambers, the first flange comprising first passages for the dielectric liquid between the first and second chambers and the second flange comprising second passages for the dielectric liquid between the second and third chambers.

According to an embodiment, each first plate comprises first holes, each first hole facing one of the first passages, and each second plate comprises second holes, each second hole facing one of the second passages.

According to an embodiment, the first flange comprises pins projecting into the first chamber, the first holes being crossed by said pins.

According to an embodiment, the first flange comprises third openings, different from the first openings, for the passage of the cooling liquid between the first and second chambers and the second flange comprises fourth openings, different from the second openings, for the passage of the cooling liquid between the second and third chambers.

According to an embodiment, each first plate and each second plate comprises a stack of at least first and second electrically-conductive layers made of different materials, the first layer being in mechanical contact with at least two of the accumulators and the second layer being opened opposite said at least two accumulators.

According to an embodiment, the total number of electric accumulators is in the range from 100 to 500 and corresponds to a multiple of 24.

According to an embodiment, the total number of electric accumulators is equal to 144 or 168.

An embodiment also provides a battery comprising a plurality of modules such as previously defined.

An embodiment also provides a method of manufacturing a module for a battery such as previously defined, wherein the manufacturing of the first and second electrically-conductive plates comprises the steps of:
   forming first and second preforms by die-stamping;
   cutting the first electrically-conductive plates in the first preform; and
   cutting the second electrically-conductive plates in the second preform.

According to an embodiment, the first and second preforms are identical or symmetrical.

According to an embodiment, the cutting steps are steps of laser cutting, machining, or spark erosion cutting.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

The same elements have been designated with the same reference numerals in the different drawings. For clarity, only those elements which are useful to the understanding of the described embodiments have been shown and are detailed. Further, the various drawings are not to scale.

In the following description, when reference is made to terms qualifying the absolute or relative position, such as the term "upper", "lower", "lateral", or "above", reference is made to the orientation of the drawings or to a battery in a normal position of use. Unless specified otherwise, the terms "about", "approximately", "substantially", and "in the order of" signify within 10%, preferably within 5%, of the value in question.

Figure 1:
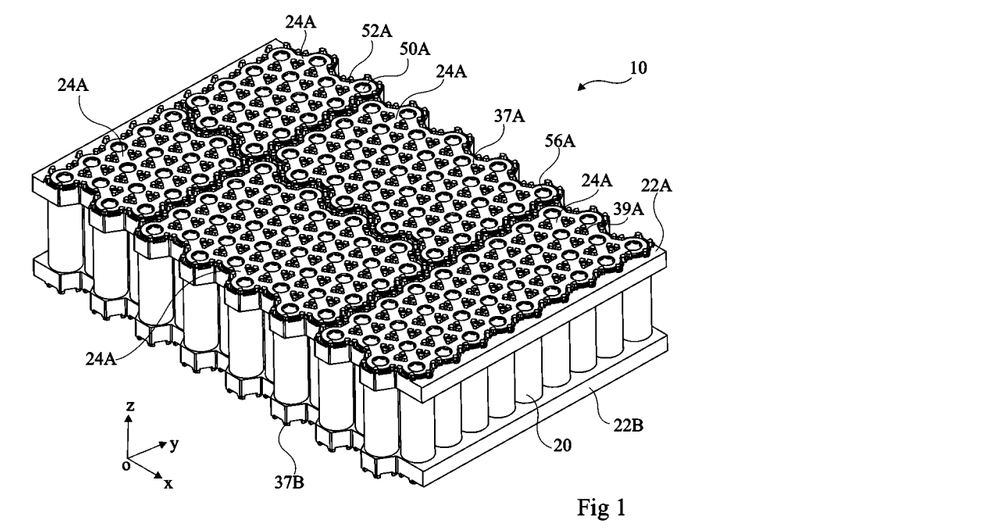
FIGS. 1 and 2 respectively are a perspective view and a cross-section view, partial and simplified, of an embodiment of an electric accumulator module.
Figure 2:
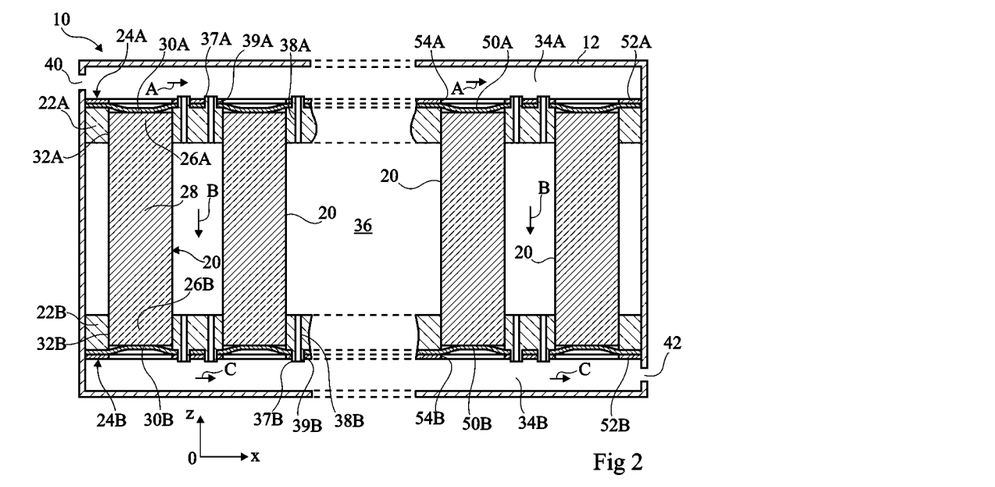

FIGS. 1 and 2 respectively are a perspective view and a cross-section view of an embodiment of an electric accumulator module 10. Call (Ox, Oy, Oz) an orthogonal reference frame. FIG. 2 comprises a cross-section view in a half-plane parallel to plane Oxz.

According to an embodiment, module 10 is inscribed within a cuboid having a dimension along direction Ox in the range from 200 mm to 400 mm, for example, approximately 300 mm, having a dimension along direction Oy in the range from 140 mm to 250 mm, for example, approximately 200 mm, and having a dimension along direction Oz in the range from 70 mm to 110 mm, for example, approximately 90 mm.

Certain elements of module 10 are symmetrical with respect to a plane of symmetry parallel to plane Oxy. In the rest of the disclosure, to designate elements of module 10 at least partly symmetrical with respect to this plane of symmetry, one uses as a reference the same number followed by suffix A to designate the element located on one side of the plane of symmetry and followed by suffix B to designate the element located on the other side of the plane of symmetry.

Module 10 contains:
   electric accumulators 20;
   an upper flange 22A and a lower flange 22B for holding accumulators 20; and
   upper connection plates 24A resting on upper flange 22A and electrically coupling accumulators 20 and lower connection plates 24B resting on lower flanges 22B and electrically coupling accumulators 20.

Module 10 may comprise from 2 to 500 accumulators 20, preferably from 50 to 500, more preferably from 100 to 500, more preferably still 144 accumulators or 168 accumulators. As shown in FIG. 2, each accumulator 20 comprises first and second ends 26A, 26B, and an intermediate portion 28 extending between the two ends 26A, 26B. Accumulators 20 for example have a generally cylindrical shape, particularly with a circular base, or a prismatic shape of axis Oz. Accumulators 20 are for example lithium-ion accumulators, particularly lithium-ion accumulators of lithium iron phosphate accumulator or LFP accumulator type, lithium-ion accumulators of nickel manganese cobalt or NMC accumulator type, lithium-ion accumulators of lithium nickel cobalt aluminum oxide or NCA accumulator type, lithium-ion accumulators of lithium manganese oxide or LMO accumulator type. The length of accumulators 20 along axis Oz may vary from 30 mm to 110 mm, and may for example approximately be 65 mm. In the case of cylindrical accumulators 20 with a circular base, the diameter of each accumulator 20 may be in the range from 10 mm to 27 mm, and may for example approximately be 18 mm. Each accumulator 20 further comprises first and second electric terminals 30A, 30B. For each accumulator 20, the first terminal 30A is preferably located on first end 26A and the second terminal 30B is preferably located on second end 26B.

The dimension of each flange 22A, 22B along direction Ox is substantially equal to the dimension of module 10 along direction Ox. The dimension of each flange 22A, 22B along direction Oy is substantially equal to the maximum dimension along direction Oy of the internal volume of module 10. Flanges 22A, 22B may be made of any electrically-insulating material having a good mechanical strength such as for example polyoxymethylene (POM), polyamide (PA, particularly PA66), polyetheretherketone (PEEK), but also materials based on wood.

Each flange 22A, 22B comprises through openings 32A, 32B, shown in FIG. 2, having the ends 26A, 26B of accumulators 20 housed therein. More particularly, for each accumulator 20, the end 26A of accumulator 20 is housed in one of the openings 32A of upper flange 22A and the end 26B of accumulator 20 is housed in one of the openings 32B of lower flange 22B. According to an embodiment, openings 32B are oriented along direction Oz and have a shape complementary to that of ends 26A, 26B of accumulators 20. According to the desired connection of accumulators 20, for each accumulator 20, the positive terminal of accumulator 20 may be located at the level of upper flange 22A or of lower flange 22B. Accumulators 20 may be arranged in quincunx. The distance between the axes of two adjacent accumulators may be in the range from 18.5 mm to 22 mm, for example, approximately 20 mm. The minimum interval between two adjacent accumulators 20 may be in the range from 0.5 mm to 4 mm, for example, approximately 2 mm.

According to an embodiment, each accumulator 20 is tightly assembled in the associated openings 32A, 32B. Preferably, there is no glue used for the securing of accumulators 20 to flanges 22A, 22B.

Upper flange 22A delimits an upper chamber 34A, for example, with a package element 12 only shown in FIG. 2 or with another module as described in further detail hereafter. Lower flange 22B delimits a lower chamber 34B with package element 12. Flanges 22A, 22B delimit together an intermediate chamber 36. Chambers 34A, 34B, and 36 are shown in FIG. 2. Upper chamber 34A comprises a cooling liquid intake port 40 and lower chamber 34B comprises a cooling liquid discharge port 42. Ports 40 and 42 are located at opposite ends of chambers 34A and 34B along direction Ox.

Each connection plate 24A, 24B couples the positive or negative terminals of a first assembly of accumulators 20 with the negative or positive terminals of a second assembly of accumulators 20. The assembly of accumulators 20 and of connection plates 24A, 24B forms an electric circuit where accumulators 20 are connected in series and/or in parallel between first and second access nodes, each access node corresponding to one of connection plates 24A or 24B. The orientations of accumulators 20 and the layout and the dimensions of connection plates 24A, 24B enable to obtain the desired series/parallel connection of accumulators 20. According to an embodiment, the number of accumulators 20 connected to each connection plate 24A, 24B varies from 2 to 500 accumulators 20. According to an embodiment, each connection plate 24A, 24B is connected to the positive terminal of from 1 to 500 accumulators 20 and to the negative terminal of from 1 to 500 accumulators 20. Two adjacent connection plates 24A or 24B are spaced apart by a distance which particularly depends on the voltage delivered by module 10, for example, preferably of at least two millimeters for a 60-V voltage delivered by the module and preferably of at least 6 mm for a 400-V voltage delivered by the module.

Each flange 22A, 22B comprises pins 37A, 37B directed towards connection plates 24A, 24B. Each flange 22A, 22B comprises additional through openings 38A, 38B oriented along direction Oz. Additional through openings 38A, 38B may cross flanges 22A, 22B substantially at the center of pins 37A, 37B. According to an embodiment, each additional through opening 38A. 38B is cylindrical, of axis Oz, with a circular base. The diameter of each additional through opening 38A, 38B is in the range from 0.5 mm to 5 mm.

Connection plates 24A, 24B comprise through holes 39A, 39B. Some pins 37A, 37B extend through the holes 39A, 39B of connection plates 24A, 24B. Pins 37A, 37B enable to ease the positioning of connection plates 24A, 24B, particularly before they are secured to accumulators 20.

According to another embodiment, pins 37A, 37B are not present. Through holes 39A, 39B may then be located in line with additional openings 38A, 38B.

Figure 3:
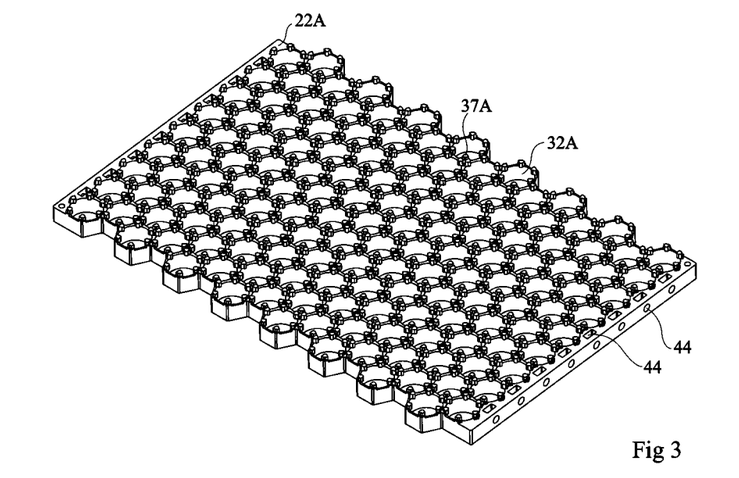
FIGS. 3 and 4 respectively are a partial simplified perspective and top view of a flange of the module shown in FIG. 1.
Figure 4:
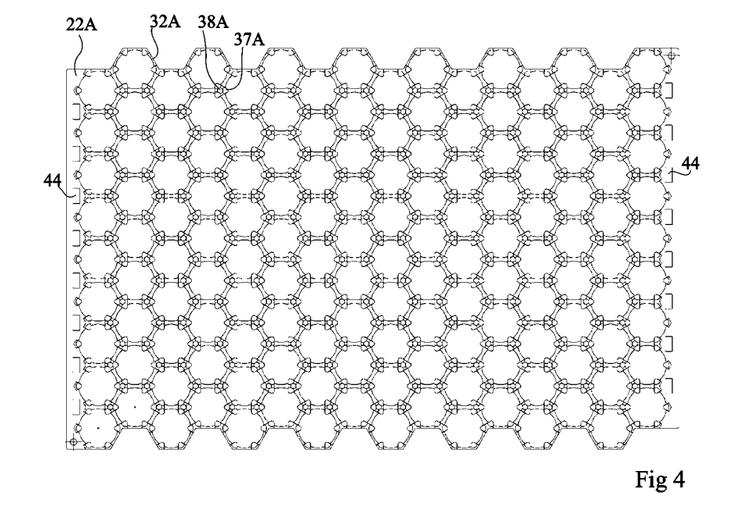

FIGS. 3 and 4 respectively are a perspective view and a top view, partial and simplified, of the upper flange 22A of the module 10 shown in FIG. 1. As shown in FIG. 4, except for the pins 37A located on the sides of flange 22A, each pin 37A has, in top view, a cross-section inscribed within an equilateral triangle. Further, each pin 37A overhangs at least one of through openings 32A, 32B. Pins 37A thus play the role of stops along direction Oz when accumulators 20 are arranged on flanges 22A, 22B. Further, FIGS. 3 and 4 show additional openings 44, not shown in FIGS. 1 and 2, that may be used to secure lateral walls, not shown, to the flanges.

Intermediate chamber 36 communicates with upper chamber 34A only via through openings 38A and holes 39A and intermediate chamber 36 communicates with lower chamber 34B only via openings 38B and holes 39B. According to an embodiment, each through hole 39A, 39B is cylindrical, of axis Oz, with a circular base. The diameter of each through hole 39A, 39B may be substantially equal to that of additional through openings 38A, 38B.

According to an embodiment, connection plates 24A, 24B may be cut in a same preform.

Ports 40 and 42 may have an elongated shape. The elongated shape of ports 40, 42 provides a more homogeneous distribution of the cooling liquid in chambers 34A, 34B. As a variant, elongated port 40, 42 may be replaced with a point-shaped port. Elongated port 40, 42 for example extends along direction Oy.

In operation, a dielectric cooling liquid is intended to flow through module 10. The dielectric cooling liquid may be selected from the group comprising a synthetic oil and a poly-alpha-olefin oil, a natural or synthetic ester, a mineral electric transformer oil, or any other fluid having a dielectric rigidity enabling to insulate the cells from one another in any circumstance of use of the system. As a non-limiting example, the dielectric cooling liquid is selected from the group comprising perfluorohexane, perfluoromethylcyclohexane, perfluoro-1,3-dimethylcyclohexane, perfluorodecalin, perfluoromethyldecalin, trichlorofluoromethane, trichlorotrifluoroethane, methanol, and ethanol. As shown in FIG. 2, the cooling liquid penetrates into upper chamber 34A through elongated port 40 (arrows A). From upper chamber 34A, the cooling liquid then penetrates into intermediate chamber 36 through openings 38A. The cooling liquid then flows through intermediate chamber 36 in contact with accumulators 20 (arrows B). In intermediate chamber 36, the cooling liquid mainly flows along direction Oz. From intermediate chamber 36, the cooling liquid then penetrates into lower chamber 36 through openings 38B. From lower chamber 34B, the cooling liquid is discharged through port 42 (arrows C). The flowing of the cooling liquid in contact with accumulators 20 enables to obtain an optimal cooling performance. The dimensions and the distribution of openings 38A, 38B are preferably selected so that the flowing of the cooling liquid is substantially homogeneous in intermediate chamber 36.

Module 10 may comprise a first electric conductor, not shown, for example, a cable or a plate, which is electrically coupled to the connection plate 24A or 24B corresponding to the first access node of the electric circuit formed by accumulators 20, and which may be screwed to the connection plate 24A or 24B corresponding to the first access node of the electric circuit formed by accumulators 20, and a second electric conductor, not shown, for example, a cable or a plate, which is electrically coupled to the connection plate 24A or 24B corresponding to the second access node of the electric circuit formed by accumulators 20, and which may be screwed to the connection plate 24A or 24B corresponding to the second access node of the electric circuit formed by accumulators 20. The first and/or second conductors are intended to connect the module to electric terminals or to another module.

Module 10 may further comprise sensors, not shown, capable of measuring different signals during the operation of module 10. As an example, the sensors may comprise at least one temperature sensor to measure the temperature in the vicinity of accumulators 20. Preferably, module 10 comprises a plurality of temperature sensors. As an example, the sensors may comprise sensors of the voltages across accumulators 20. Module 10 may further comprise at least one heating element used to heat accumulators 20.

According to an embodiment, module 10 may comprise a printed circuit, for example, a flexible printed circuit, not shown, having the sensors and/or the heating elements provided thereon. The flexible printed circuit then comprises electrically-conductive tracks, for example, made of copper, on a support film, and electronic components or electronic circuits are secured to the conductive tracks. As an example, when the flexible printed circuit comprises a heating element used to heat accumulators 20, the latter may correspond to a resistive track or to a copper track having an adapted cross-section and length to generate heat when it is crossed by a current. According to an embodiment, the flexible printed circuit may comprise a RFID tag (radiofrequency identification). The flexible printed circuit may be connected to the battery accumulators 20. The printed circuit may be coupled to a processing unit located outside or inside of module 10, for example, by electric conductors, particularly a flexible sheet.

According to an embodiment, the structure of connection plates 24A, 24B is selected to fulfill several criteria:
  connection plates 24A, 24B can be welded to accumulators 20;
  connection plates 24A, 24B are good electric conductors;
  the manufacturing cost of connection plates 24A, 24B is low;
  connection plates 24A, 24B all have the same structure, but possibly different shapes, including the connection plates playing the role of access nodes and intended to be connected to electric conductors; and
  the securing of the electric conductors to the connection plates playing the role of access nodes may be performed by mechanical clamping, for example, by screwing.

The maximum thickness of each connection plate 24A, 24B is in the range from 0.2 mm to 2 mm. In the present embodiment such as shown in FIG. 2, each connection plate 24A, 24B comprises a stack of at least a first electrically-conductive layer 50A, 50B and of a second electrically-conductive layer 52A, 52, shown in FIG. 2. First layer 50A, 50B is in mechanical contact with accumulators 20. Second layer 52A, 52B comprises openings 54A, 54B located opposite accumulators 20 so that only the first layer 50A, 50B is present opposite accumulators 20. Slots 56A, shown in FIG. 1, may be provided in the exposed portion of first layer 50A at the level of openings 54A.

According to an embodiment, first layer 50A, 50B is made of a material selected from the group comprising nickel-plated steel, nickel, nickel-plated copper and any other material allowing an easy welding on accumulators 20. The thickness of first layer 50A, 50B is in the range from 0.1 mm to 0.5 mm. According to an embodiment, second layer 52A, 52B is made of a material selected from the group comprising copper, aluminum, beryllium copper, and any material having a good electric conductivity. The thickness of second layer 52A, 52B is in the range from 0.2 mm to 2 mm. The electric conductivity properties of connection plate 24A, 24B are essentially provided by second layer 52A, 52B while the material forming first layer 50A, 50B is particularly selected to obtain a connection of good quality with accumulators 20, particularly to ease the welding of first layer 50A, 50B with accumulators 20. Further, the material forming second layer 52A, 52B is selected to allow an electric connection with an electric conductor, particularly by mechanical clamping and in particular by screwing, between second layer 52A, 52B and the electric conductor. The connection plates 24A and 24B which play the role of the first and second access nodes thus have the same structure as the other connection plates, which would not be possible if connection plates 24A, 24B were made of aluminum due to the inevitable forming, in the absence of a treatment, of an electrically-insulating layer on the aluminum surface.

A battery may comprise a plurality of modules 10 such as previously described connected in series and/or in parallel.

Figure 5:
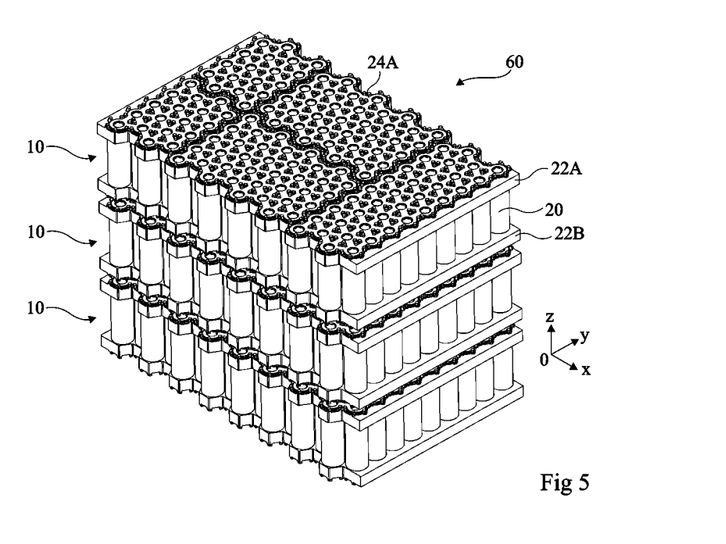
FIGS. 5 and 6 are partial simplified perspective views of embodiments of a battery comprising a plurality of electric accumulators such as shown in FIG. 1.

FIG. 5 is a partial simplified perspective view of an embodiment of a battery 60 comprising a plurality of modules 10 stacked along direction Oz. In this embodiment, for certain modules, the upper chamber 34A and/or the lower chamber 34B of the module may be delimited by the flanges 22A, 22B of two adjacent modules. In this embodiment, for the modules located at the ends of the stack of modules, the upper chamber 34A and/or the lower chamber 34B of module 10 may be delimited by a package, not shown, containing the stack of modules 10.

Figure 6:
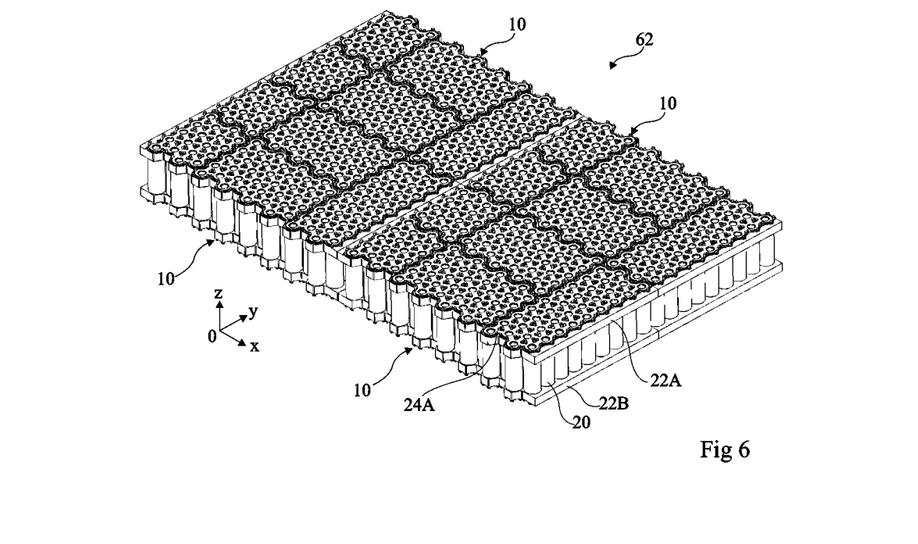

FIG. 6 is a partial simplified perspective view of an embodiment of a battery 62 comprising a plurality of modules 10 arranged next to one another in plane (Oxy). In this embodiment, the upper chamber 34A and/or the lower chamber 34B of each module 10 may be delimited by a package, not shown, containing modules 10.

The flowing of the cooling liquid in modules 10 is implemented by a pump. The cooling liquid then supplies each module 10. After having crossed each module 10, as previously described, the cooling liquid is recovered.

In the case where each module 10 comprises sensors, all the sensors of the modules may be coupled to a processing module. The processing unit may correspond to a dedicated circuit or may comprise a processor, for example, a microprocessor or a microcontroller, capable of executing instructions of a computer program stored in the memory. The processing unit may plays the role of a system for controlling the battery capable, for example, of monitoring the voltages of accumulators 20 to remain within an authorized operating range, of monitoring the charge level of accumulators 20, and possibly of achieving the balance of these charges, of regulating the charge current during recharge periods, of regulating the discharge current, of monitoring the temperature of accumulators 20, of controlling the flowing of the cooling liquid, etc.

As an example, the number of series-connected accumulators 20 of the battery may vary from four, particularly for a battery delivering a voltage in the order of 12 V, to more than one hundred, particularly for a battery delivering a voltage greater than 700 V or 1,000 V. The battery is for example intended to be used to power a laptop computer or a wireless screw gun, for example with four series-connected accumulators, an electric power-assisted bike, an electric car, or another electric vehicle.

Figure 7:
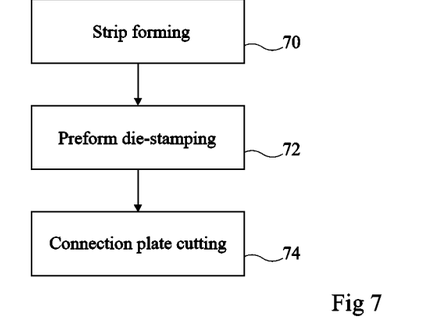
FIG. 7 is a block diagram illustrating an embodiment of a method of manufacturing the connection plates of the module.

FIG. 7 is a block diagram illustrating an embodiment of a method of manufacturing the connection plates 24A, 24B of module 10.

Step 70 comprises the manufacturing of a strip where connection plates 24A, 24B will be formed. According to an embodiment, in the case where connection plates 24A, 24B have a multilayer structure, step 70 may comprise the forming of a strip comprising said stack of layers. According to an embodiment, in the case where connection plates 24A, 24B comprise the previously-described stack of first layer 50A, 50B and of second layer 52A, 52B, step 70 may comprise the separate cutting of first layer 50A, 50B and of second layer 52A, 52B, particularly the forming of openings 54A, 54B in second layer 52A, 52B and the securing, for example, by laser welding, of second layer 52A, 52B to first layer 50A, 50B.

Step 72 comprises the forming, in the strip obtained at step 70, of preforms where connection plates 24A, 24B will be cut. For each module 10, a first preform is formed in which connection plates 24A will be cut and a second preform is formed in which connection plates 24B will be cut. According to an embodiment, each preform is obtained by die-stamping of the strip formed at step 70. The circumference of the first preform corresponds to the envelope of connection plates 24A and the circumference of the second preform corresponds to the envelope of connection plates 24B. Further, during the die-stamping operation, openings 39A, 39B are also formed in the first and second layers 50A, 50B, 52A, 52B and slots 56A are also formed in first layer 50A, 50B. The die-stamping step advantageously enables to simultaneously form a significant number of openings, the forming of which by machining would have a high cost. According to an embodiment, the preforms are identical whatever the shapes of connection plates 24A, 24B. This enables to use at step 72 the same stamping die whatever the shapes of connection plates 24A, 24B.

Step 74 comprises the cutting of connection plates 24A in the first preform and the cutting of connection plates 24B in the second preform. The cutting may be a laser cutting, a machining, or a spark erosion cutting, particularly by wire spark erosion.

Figure 8:
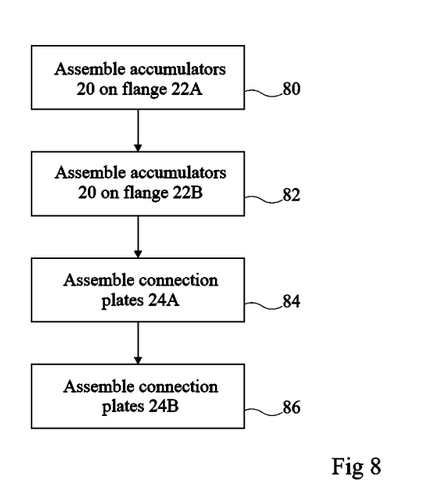
FIG. 8 is a block diagram illustrating an embodiment of a method of assembly of a battery module.

FIG. 8 is a block diagram illustrating an embodiment of a method of manufacturing a module 10.

Step 80 comprises the placing of accumulators 20 on one of flanges 22A.

Step 82 comprises the addition of the other flange 22B on the accumulators.

Step 84 comprises the placing of each connection plate 24A on upper flange 22A and the securing of each connection plate 24A to the accumulators, for example, by electric welding.

Step 86 comprises the placing of each connection plate 24B on lower flange 22B and the securing of each connection plate 24B to accumulators 20, for example, by electric welding.

The mechanical connections between flanges 22A, 22B and package 12, between flanges 22A, 22B and accumulators 20, and between connection plates 24A, 24B and accumulators 20 ensure the rigidity of the assembly and the holding of accumulators 12.

An embodiment of a method of manufacturing a battery comprises stacking a plurality of modules and electrically connecting the modules to one another.

Accumulators 20 are distributed into S stages of accumulators, each stage comprising P accumulators 20, the S accumulator stages being series-connected and, for each stage, the P accumulators of the stage are connected in parallel. The connection of accumulators 20 is formed by connection plates 24A, 24B. The electric circuit formed by accumulators 20 may easily be modified by changing the layout and the dimensions of connection plates 24A, 24B and/or by changing the orientation of accumulators 20 without modifying package 12 or flanges 22A, 22B. Module 10 may thus easily be modified to adapt to different applications.

Advantageously, the total number of accumulators 20 forming module 10 is selected to enable to form a significant number of configurations where the number S of stages and the number P of accumulators 20 per stage are different. According to an embodiment, the total number of accumulators 20 forming module 10 is a multiple of eight. According to an embodiment, the total number of accumulators 20 forming module 10 is a multiple of twenty-four.

According to an embodiment, the total number of accumulators enables to arrange the accumulators so that, seen along direction (Oz), the accumulators are inscribed within a rectangle having a ratio of its small side to its large side in the range from ⅓ to ⅔. This enables to form a compact module. According to an embodiment, the total number of accumulators 20 forming module 10 is equal to 144 or to 168. Advantageously, when the total number of accumulators 20 forming module 10 is equal to 144, the accumulators may be arranged so that, seen along direction (Oz), the accumulators are inscribed within a rectangle having a ratio of its small side to its large side approximately equal to ⅔. Advantageously, when the total number of accumulators 20 forming module 10 is equal to 168, the accumulators may be arranged so that, seen along direction (Oz), the accumulators are inscribed within a rectangle having a ratio of its small side to its large side approximately equal to ⅔.

Table I hereafter comprises the different possible configurations in the case where the total number of accumulators 20 of the module is equal to 144. For each configuration, the minimum voltage Umin delivered by module 10, the average voltage Umoy delivered by module 10, and the maximum voltage Umax delivered by module 10 in the case where each accumulator 20 is of lithium iron phosphate or LFP accumulator type, and in the case where each accumulator 20 is of nickel manganese cobalt or NMC accumulator type, are indicated.

TABLE I

| | | LFP | | | NMC | | |
|---|---|---|---|---|---|---|---|
| S | P | Umin | Umoy | Umax | Umin | Umoy | Umax |
| 1 | 144 | 2.5 | 3.2 | 3.65 | 2.5 | 3.635 | 4.2 |
| 2 | 72 | 5 | 6.4 | 7.3 | 5 | 7.27 | 8.4 |
| 3 | 48 | 7.5 | 9.6 | 10.95 | 7.5 | 10.91 | 12.6 |
| 4 | 36 | 10 | 12.8 | 14.6 | 10 | 14.54 | 16.8 |
| 6 | 24 | 15 | 19.2 | 21.9 | 15 | 21.81 | 25.2 |
| 8 | 18 | 20 | 25.6 | 29.2 | 20 | 29.08 | 33.6 |
| 9 | 16 | 22.5 | 28.8 | 32.85 | 22.5 | 32.72 | 37.8 |
| 12 | 12 | 30 | 38.4 | 43.8 | 30 | 43.62 | 50.4 |
| 16 | 9 | 40 | 51.2 | 58.4 | 40 | 58.16 | 67.2 |
| 18 | 8 | 45 | 57.6 | 65.7 | 45 | 65.43 | 75.6 |
| 24 | 6 | 60 | 76.8 | 87.6 | 60 | 87.24 | 100.8 |
| 36 | 4 | 90 | 115.2 | 131.4 | 90 | 130.9 | 151.2 |
| 48 | 3 | 120 | 153.6 | 175.2 | 120 | 174.5 | 201.6 |
| 144 | 1 | 360 | 460.8 | 525.6 | 360 | 523.4 | 604.8 |

The following table II is a table similar to table I in the case where the total number of accumulators 20 of the module is equal to 168.

TABLE II

| | | LFP | | | NMC | | |
|---|---|---|---|---|---|---|---|
| S | P | Umin | Umoy | Umax | Umin | Umoy | Umax |
| 1 | 168 | 2.5 | 3.2 | 3.65 | 2.5 | 3.635 | 4.2 |
| 2 | 84 | 5 | 6.4 | 7.3 | 5 | 7.27 | 8.4 |
| 3 | 56 | 7.5 | 9.6 | 10.95 | 7.5 | 10.905 | 12.6 |
| 4 | 42 | 10 | 12.8 | 14.6 | 10 | 14.54 | 16.8 |
| 6 | 28 | 15 | 19.2 | 21.9 | 15 | 21.81 | 25.2 |
| 7 | 24 | 17.5 | 22.4 | 25.55 | 17.5 | 25.445 | 29.4 |
| 8 | 21 | 18 | 25.6 | 29.2 | 18 | 29.08 | 33.6 |
| 12 | 14 | 30 | 38.4 | 43.8 | 30 | 43.62 | 50.4 |
| 14 | 12 | 35 | 44.8 | 51.1 | 35 | 50.89 | 58.8 |
| 21 | 8 | 52.5 | 67.2 | 76.65 | 52.5 | 76.335 | 88.2 |
| 24 | 7 | 60 | 76.8 | 87.6 | 60 | 87.24 | 100.8 |
| 28 | 6 | 70 | 89.6 | 102.2 | 70 | 101.78 | 117.6 |
| 42 | 4 | 105 | 134.4 | 153.3 | 105 | 152.67 | 176.4 |
| 56 | 3 | 140 | 179.2 | 204.4 | 140 | 203.56 | 235.2 |
| 84 | 2 | 210 | 268.8 | 306.6 | 210 | 305.34 | 352.8 |
| 168 | 1 | 420 | 537.6 | 613.2 | 420 | 610.68 | 705.6 |

FIGS. 9 to 20 are top views of preforms 90 exhibiting cutting lines 92 along which the connection plates will be cut for different connection configurations of the accumulators of a module comprising 144 accumulators distributed into S stages, each comprising P accumulators. In the drawings, symbol ⊕ has been placed next to the connection plate which plays the role of the first access node and which is intended to be electrically coupled to an electric terminal of the battery or to an access node of another module by an electric conductor and symbol ⊖ has been placed next to the connection plate which plays the role of the second access node and which is intended to be electrically coupled to an electric terminal of the battery or to an access node of another module by an electric conductor. Each connection plate 24A or 24B playing the role of an access node is connected to P accumulators while each other connection plate 24A and 24B is connected to the positive terminals of P accumulators and to the negative terminals of P accumulators. In FIGS. 9 to 20, slots 56A, formed in layer 50A at the level of each opening 54A provided in layer 52A, are as an example H-shaped.

Figure 9:
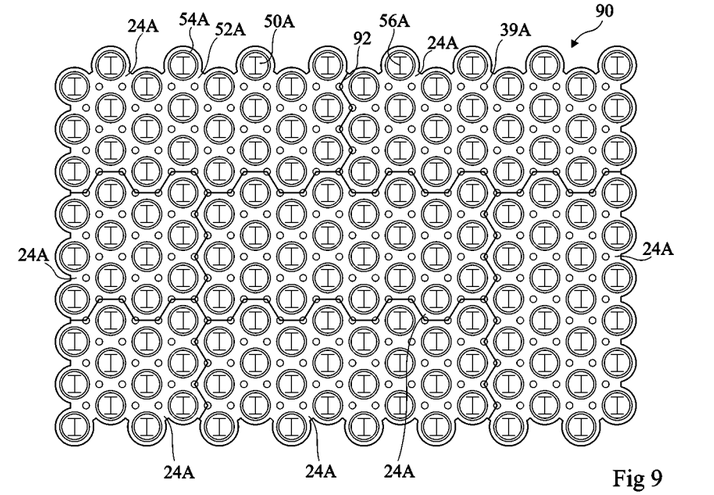
FIGS. 9 to 20 are top views of preforms showing cutting lines along which the connection plates will be cut for different connection configurations of the accumulators of a module.
Figure 10:
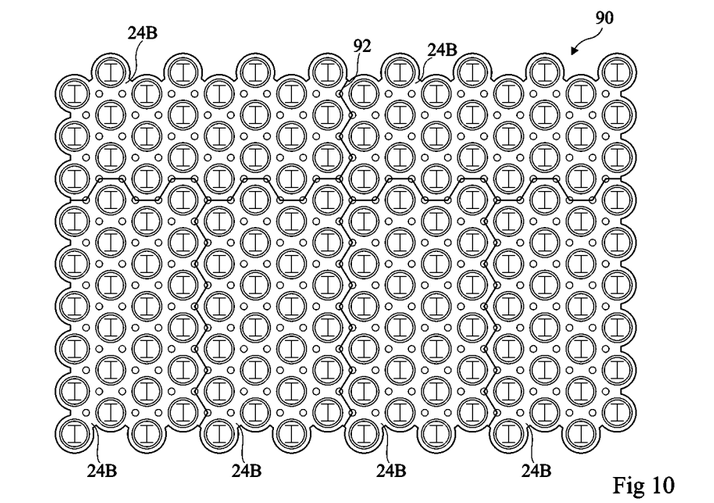

FIGS. 9 and 10 correspond to the configuration comprising 12 stages of 12 accumulators. FIG. 9 shows the cutting lines 92 for the 7 connection plates 24A and FIG. 10 shows the cutting lines 92 for the 6 connection plates 24B.

Figure 11:
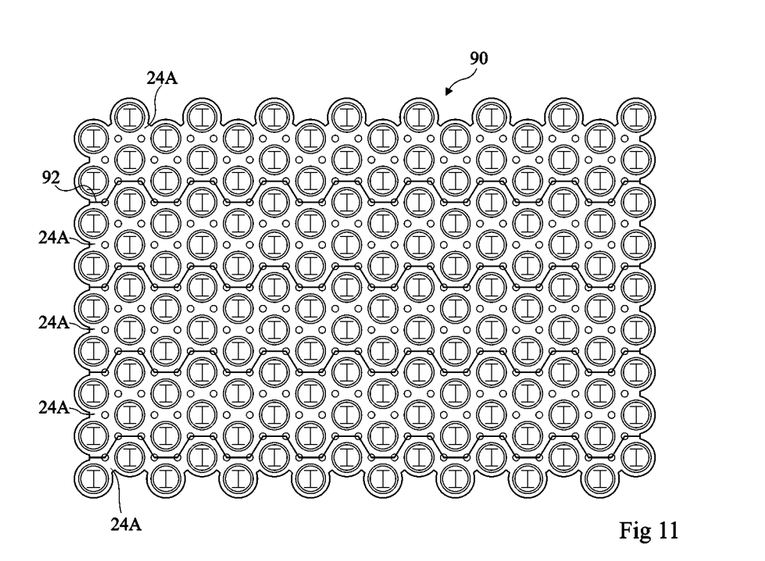
Figure 12:
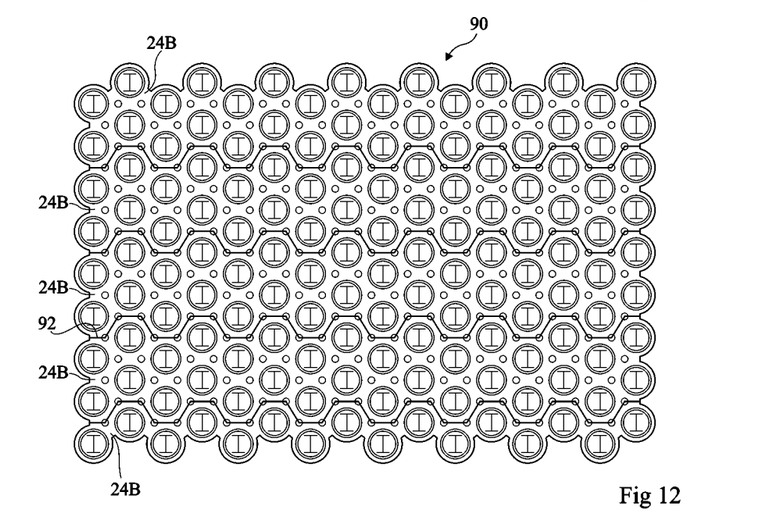

FIGS. 11 and 12 correspond to the configuration comprising 9 stages of 16 accumulators. FIG. 11 shows the cutting lines 92 for the 5 connection plates 24A and FIG. 12 shows the cutting lines 92 for the 5 connection plates 24B.

Figure 13:
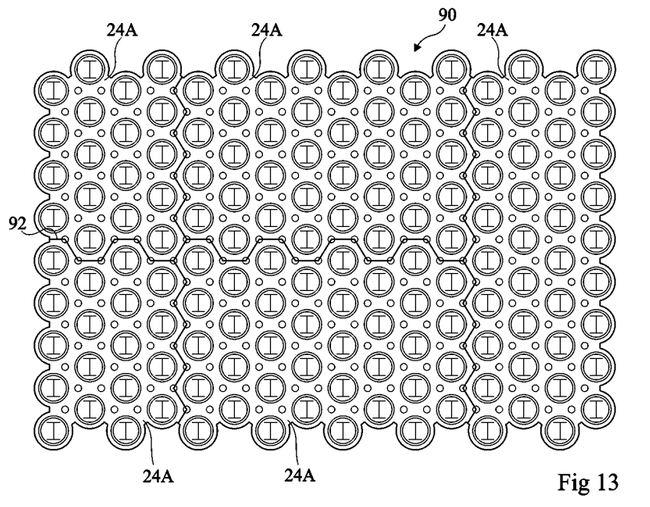
Figure 14:
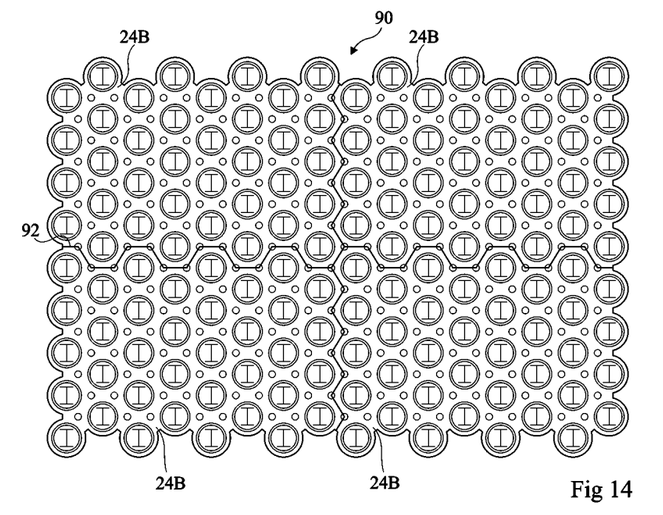

FIGS. 13 and 14 correspond to the configuration comprising 8 stages of 18 accumulators. FIG. 13 shows the cutting lines 92 for the 5 connection plates 24A and FIG. 14 shows the cutting lines 92 for the 4 connection plates 24B.

Figure 15:
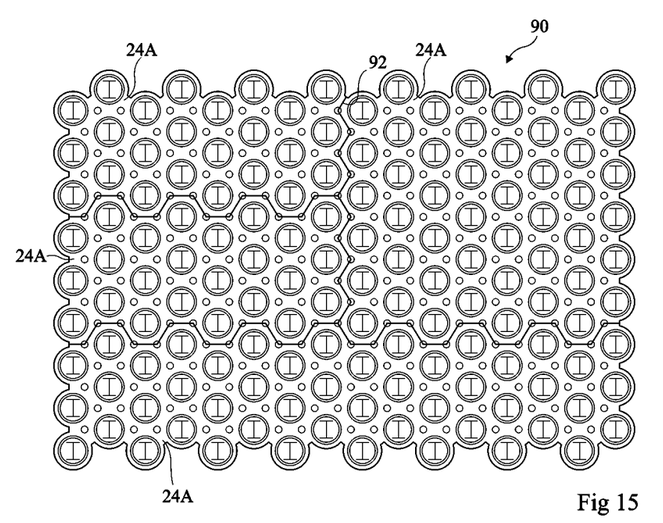
Figure 16:
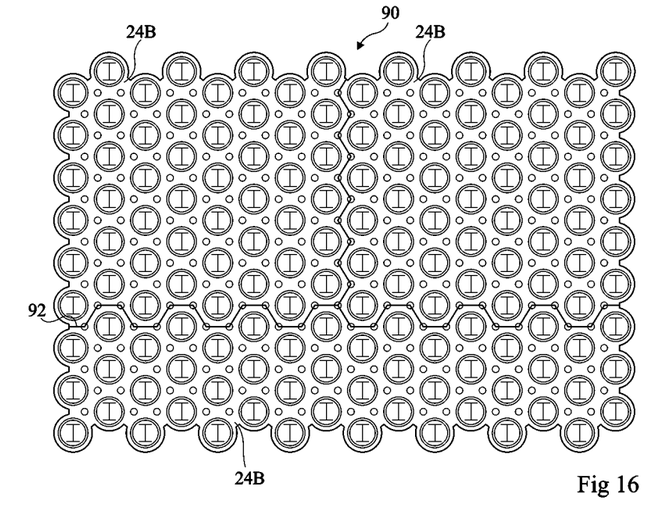

FIGS. 15 and 16 correspond to the configuration comprising 6 stages of 24 accumulators. FIG. 15 shows the cutting lines 92 for the 4 connection plates 24A and FIG. 16 shows the cutting lines 92 for the 3 connection plates 24B.

Figure 17:
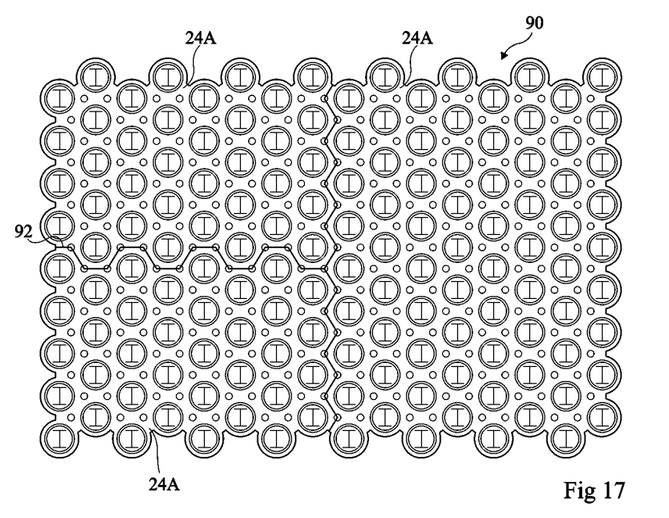
Figure 18:
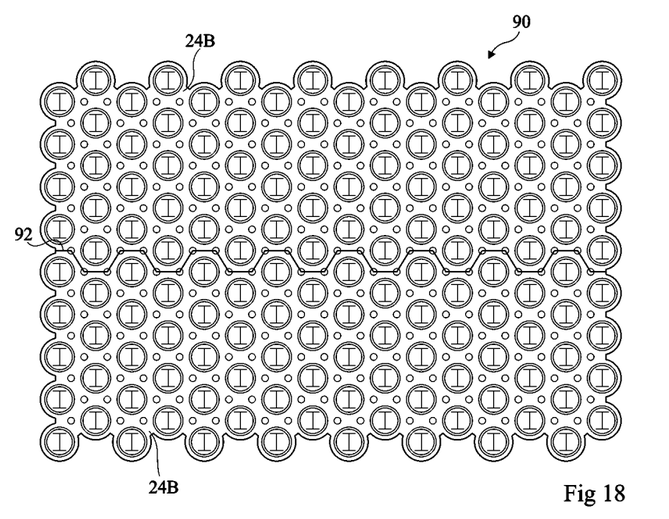

FIGS. 17 and 18 correspond to the configuration comprising 4 stages of 36 accumulators. FIG. 17 shows the cutting lines 92 for the 3 connection plates 24A and FIG. 18 shows the cutting lines 92 for the 2 connection plates 24B.

Figure 19:
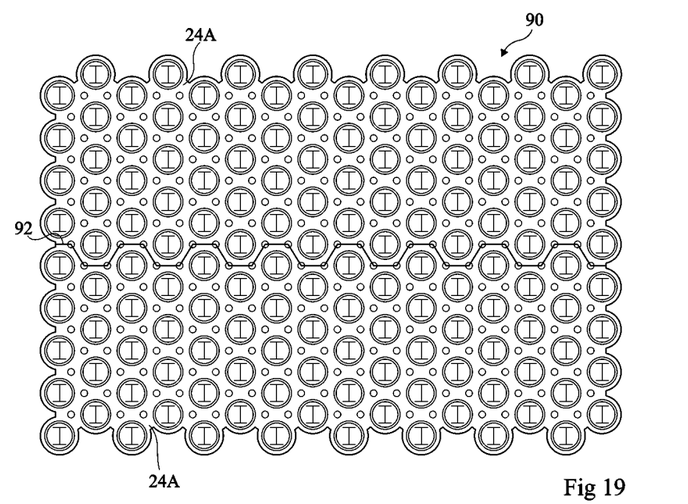
Figure 20:
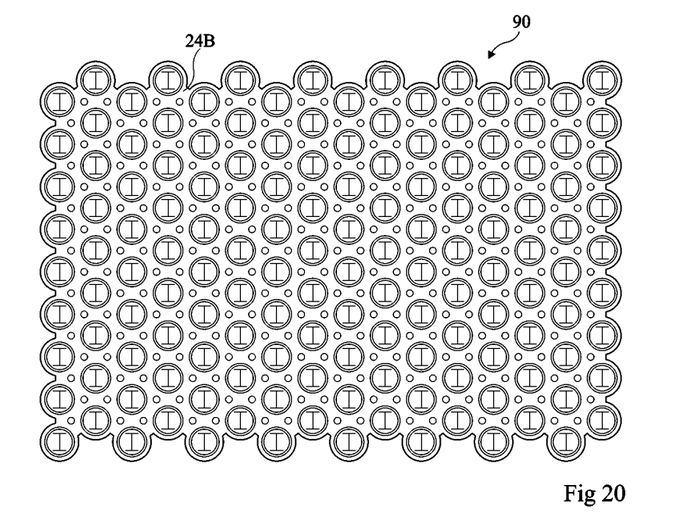

FIGS. 19 and 20 correspond to the configuration comprising 2 stages of 72 accumulators. FIG. 19 shows the cutting lines 92 for the 2 connection plates 24A and FIG. 20 shows the single connection plate 24B.

Various embodiments have been described. Various alterations and modifications will readily occur to those skilled in the art. Various embodiments with various variations have been described hereabove. It should be noted that those skilled in the art may combine these various embodiments and variations without showing any inventive step.

What is claimed is:

1. A module for a battery comprising:
   accumulators, each accumulator having first and second ends and an intermediate portion extending along one direction and coupling the first and second ends;
   a first flange comprising first through openings, the first ends of the accumulators being secured in the first openings;
   first electrically-conductive plates, each first plate being connected to the first ends of the accumulators of a first assembly of accumulators among first assemblies of accumulators;
   a second flange comprising second through openings, the second ends of the accumulators being secured in the second openings;
   second electrically-conductive plates, each second plate being connected to the second ends of the accumulators of a second assembly of accumulators among second assemblies of accumulators, all the first and second plates having the same structure; and
   first, second, and third chambers partly delimited by the first and second flanges and configured to contain a dielectric liquid, the first flange separating the first and second chambers and the second flange separating the second and third chambers, the first electrically-conductive plates being located in the first chamber, the second electrically-conductive plates being located in the third chamber, the intermediate portions of the accumulators being located in the second chamber, the first flange comprising first passages for the dielectric liquid between the first and second chambers and the second flange comprising second passages for the dielectric liquid between the second and third chambers, so that the dielectric liquid flows through the second chamber along said direction in contact with the accumulators, the first passages corresponding to third through openings of the first flange different from the first openings so that the dielectric fluid flows through the first passages from the first chamber to the second chamber, and the second passages corresponding to fourth through openings of the second flange different from the second openings, so that the dielectric fluid flows through the second passages from the second chamber to the third chamber.

2. The module according to claim 1, wherein each first plate comprises first holes, each first hole facing one of the first passages, and wherein each second plate comprises second holes, each second hole facing one of the second passages.

3. The module according to claim 2, wherein the first flange comprises pins projecting into the first chamber, the first holes being crossed by said pins.

4. The module according to claim 1, wherein each first plate and each second plate comprises a stack of at least first and second electrically-conductive layers made of different materials, the first layer being in mechanical contact with at least two of the accumulators and the second layer being opened opposite said at least two accumulators.

5. The module according to claim 1, wherein the total number of electric accumulators is in the range from 100 to 500 and corresponds to a multiple of 24.

6. The module according to claim 1, wherein the total number of electric accumulators is equal to 144 or to 168.

7. A battery comprising a plurality of modules according to claim 1.

8. A method of manufacturing the module for a battery according to claim 1, wherein the manufacturing of the first and second electrically-conductive plates comprises the steps of:
   forming first and second preforms by die-stamping;
   cutting the first electrically-conductive plates in the first preform; and
   cutting the second electrically-conductive plates in the second preform.

9. The method according to claim 8, wherein the first and second preforms are identical or symmetrical.

10. The method according to claim 8, wherein the cutting steps are steps of laser cutting, machining, or spark erosion cutting.

\* \* \* \* \*

UNITED STATES PATENT AND TRADEMARK OFFICE
CERTIFICATE OF CORRECTION

| | |
|---|---|
| PATENT NO. | : 12,040,465 B2 |
| APPLICATION NO. | : 15/733427 |
| DATED | : July 16, 2024 |
| INVENTOR(S) | : Matthieu Desbois-Renaudin and Jean-Noël Carminati |

It is certified that error appears in the above-identified patent and that said Letters Patent is hereby corrected as shown below:

On the Title Page

Item (72) The city of residence of the first named inventor should read as --Villard-De-Lans--.

Signed and Sealed this
Twentieth Day of August, 2024

Katherine Kelly Vidal
*Director of the United States Patent and Trademark Office*